April 10, 1945.  M. A. GLEESON  2,373,628
SPHERICAL PLUG VALVE
Filed Dec. 21, 1942  2 Sheets-Sheet 1

Inventor:
Murray A. Gleeson
By: Joseph O. Lange
Atty.

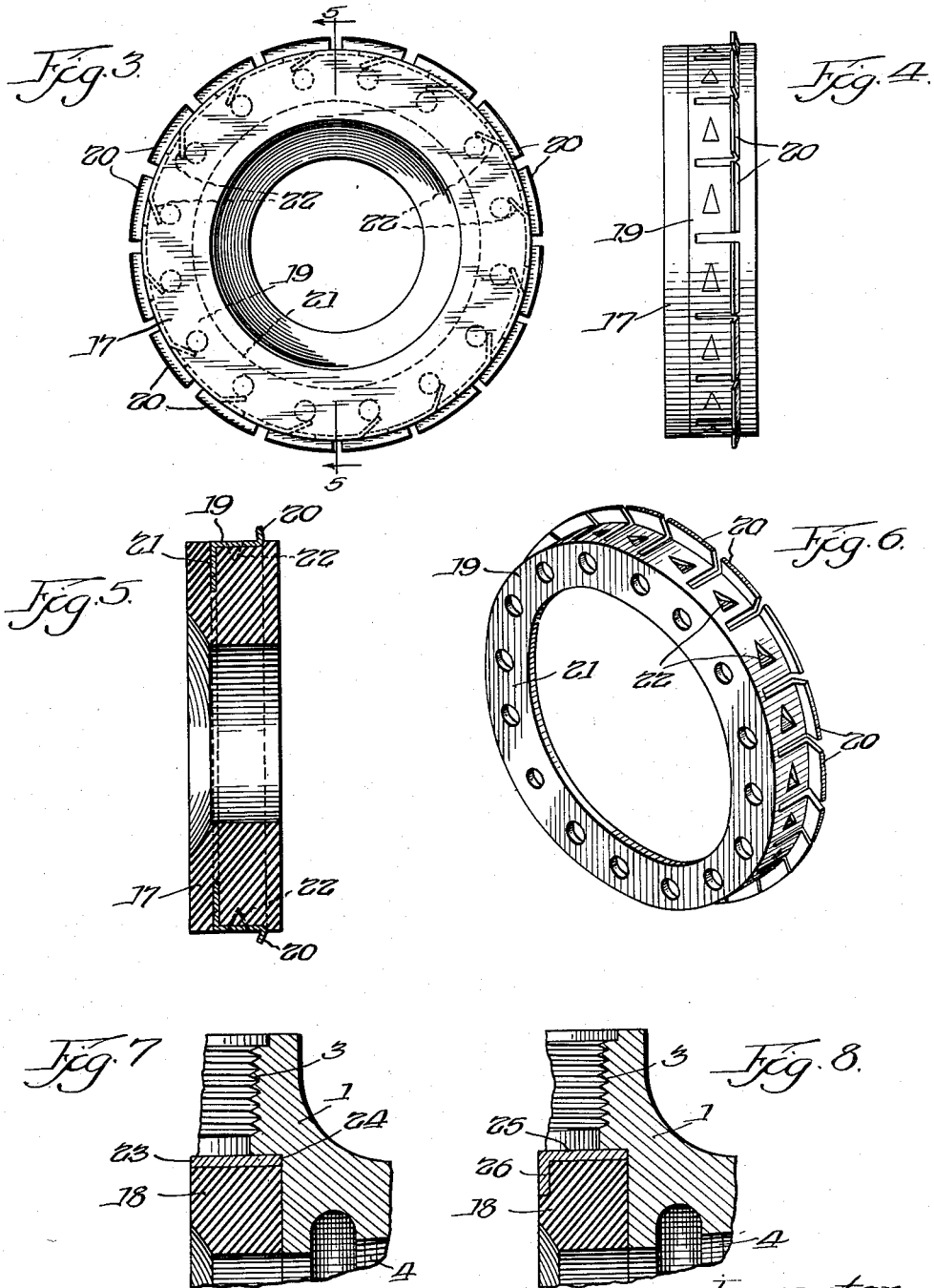

Patented Apr. 10, 1945

2,373,628

UNITED STATES PATENT OFFICE 2,373,628

SPHERICAL PLUG VALVE

Murray A. Gleeson, Chicago, Ill., assignor to Crane Co., Chicago, Ill., a corporation of Illinois Application December 21, 1942, Serial No. 469,763

5 Claims. (Cl. 251—113)

This invention relates to a new and improved type of valve and more particularly pertains to a novel rotary valve in which a spheroidal type of closure member with a particular arrangement and type of seat ring is employed.

For one of its principal objects the invention is concerned with the provision of a combination of special seat rings and mounting suitable for resistance to heat, chemicals and line pressure. For example, the seat rings may be made in such materials as synthetic rubber of the commercial types known as Thiokol, Perbunan, Synrub, Resistoflex and the like in which such casing-mounted seat rings are provided with novel means for holding the ring firmly in place within the valve body or casing.

Another important object lies in the provision of a novel construction in such ring employing a seating radius on the inside diameter conforming substantially to the radius of the plug or spheroidal type of closure member to thus effect improved valve seating with freedom from cutting by the closure member during the course of rotation.

Another important object resides in the provision of graphite impregnation in such synthetic rubber body seat rings or the like in order to lubricate and to thus prevent the rings from adhering to the closure member after the valve has been stationary or in a single position for a relatively long period of time.

A further important object is to provide in a valve of this general type combined ring support and stiffening means for maintaining the seat rings firmly in substantially undistorted position during the course of normal valve operation.

A further specific object is to provide for a molded-in spring type of insert having fingers or the like to retain the body seat ring in position so as to inhibit substantial axial movement thereof under the normal urge of line pressure or flow.

Other and further important objects of this invention will become apparent from the disclosures in the following specification read with the accompanying drawings, in which Fig. 1 is a vertical sectional assembly view of a valve embodying the principles of my invention.

Fig. 3 is a plan view of one form of insert employed with the body seat rings to maintain the latter in desired position.

Fig. 4 is a front exterior view of the insert described in connection with Fig. 3.

Fig. 5 is a section taken on the line 5—5 of Fig. 3.

Fig. 6 is a perspective exterior view of a novel insert ring.

Fig. 7 is a fragmentary sectional view of a modified insert ring.

Fig. 8 is a fragmentary sectional view of a further modified insert ring.

Similar reference numbers refer to similar parts in the various views.

Figure 1:
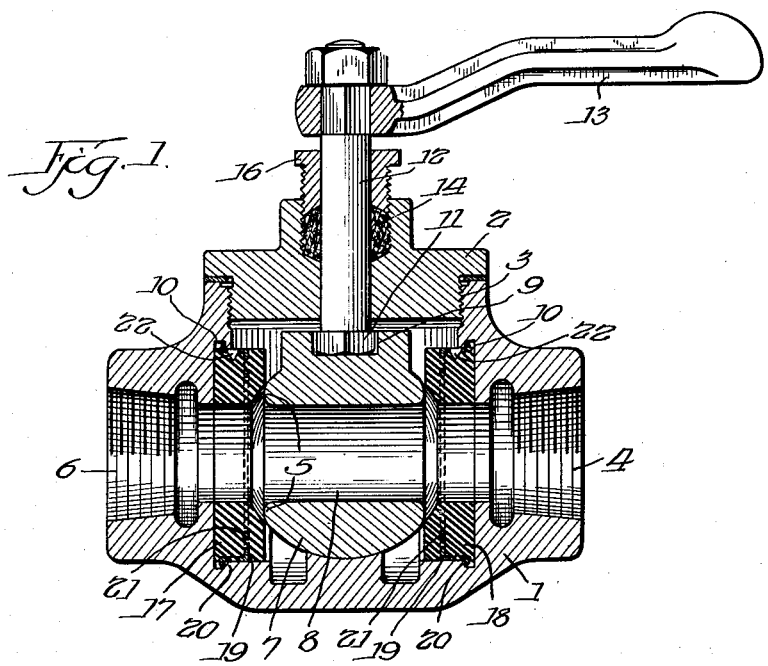

Referring to Fig. 1, the reference numeral 1 indicates generally the body or casing portion of a valve having a bonnet 2 joined to the said body by means of the screw threads 3, the body having the usual inlet 4 and the outlet 6, the latter elements being reversible, as desired. The valve of this invention employs a spheroidal type of closure member 7, having the aperture 8 therethrough adapted for connection with the inlet 4 and the outlet 6 upon suitable rotation. The spheroidal disc 7 at its upper portion is provided with a conventional socket 9 into which the similarly shaped and substantially smaller polygonal end 11 of the stem proper, which is designated 12, projects. Thus operation of the valve is accomplished by the simple rotation of the hand lever 13 through an arc of 90 degrees. The stem 12 extends through the bonnet 2 as shown and, in order to prevent leakage around the stem and past the bonnet bearing, the customary stuffing-box packing 14 with the packing nut 16 is employed, as indicated. In further detailed reference to the structure of the closure member 7, it has been found desirable to round or to flatten slightly the corners thereof substantially as indicated at 5, and in addition in some instances to polish such contact surfaces for purposes hereinafter explained at length.

The seat rings embodied in my invention and referred to at 17 and 18 may be made of synthetic rubber, natural rubber, plastics or other suitable compositions preferably resistant to heat and chemicals, in addition to withstanding the pressure loads encountered in valve operation. The casing 1, in one adaptation of my invention, is provided with the annular groove 10 which is normally engaged by the spaced-apart, resilient fingers 20 forming a series of annular projections on the molded-in spring insert 19. The latter arrangement is shown in greater detail in Figs. 3, 4, 5 and 6. The insert is preferably provided with the flange 21 which, together with the punched out projections 22, aids in firmly anchoring the insert in the molded rings 17 and 18. Obviously these details may vary substantially.

For example, in some cases the firm positioning of the rings 17 and 18 against axial movement may be dispensed with. Instead, as shown in Fig. 7, the annularly formed ring members 23 may be used to enclose the seat ring 18 for its full thickness thus permitting the end portion 24 to shoulder within the casing. Because of such substantial enclosure of the seat ring 18 and the relatively snug fit within the casing bore, as indicated, it will be apparent that the tendency of the ring to distort during the course of valve operation will be substantially minimized.

Similarly, instead of using a plain annular member, as above described, an inwardly flanged ring 25 may be used to enclose and to support the seat ring 18, as shown in Fig. 8, the flanged portion 26 aiding in the reinforcement or stiffening of the seat ring to prevent the objectionable distortion heretofore experienced in these valves.

Either of these rings may be molded or cast integrally with the molded ring to provide a snug fit therebetween, or else may be vulcanized or otherwise attached to provide a suitable connection, the means employed depending largely upon the economies effected thereby and considering the service for which the valve is to be employed.

Figure 2:
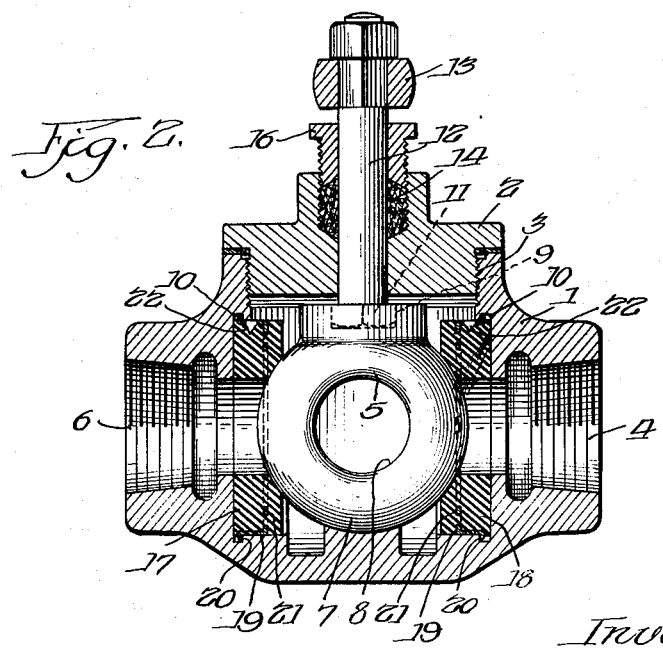
Fig. 2 is a view of the novel valve structure with the spheroidal type of closure member in the closed position or after having been rotated through an arc of 90 degrees from that position shown in Fig. 1.

It will thus be apparent that the body seat rings, in view of the arrangement above referred to are well protected against the destructive deformation heretofore experienced, and unlike previous constructions in this field of valve design will not permit the seat rings to be distorted and in many cases torn by the rubbing contact under pressure with the prior sharp edges of the closure member during valve operation. Also by use of the novel ring positioning means referred to it will be apparent that I am thus enabled to hold the seat rings with greater firmness in their respective positions within the valve casing 1. A further advantage gained by reason of such accurate positioning of the body seat rings allows for the axial length of the plug through the run (port 8) to be substantially the same as the distance between the body seat rings when finally assembled in the casing, thus facilitating the easy insertion of the closure member in the casing in its open position and subsequently effecting slight compression of the body seat rings during the closed position of the valve, that is, when the latter occupies the position shown in Fig. 2. Further, as previously referred to, because of employing slightly rounded or flattened edges on the closure member and preferably polishing the same to a high degree of smoothness, I have accomplished the important object of reducing seating surface friction at a location in the valve at which there is relatively high unit bearing load. Previously, the body seat rings have been badly cut by the sharp edges around the closure member port, because of the failure to take into consideration the importance of modifying this construction, as herein described.

It is apparent from what has been described that numerous changes may be made from the particular embodiments illustrated and it is desired therefore that the patent granted hereon be limited only to the scope of the claims appended hereto interpreted in light of the prior art.

I claim:

1. In a valve, a body having a flow passageway therethrough, seat rings mounted in said body, a spheroidal disc interposed between said seat rings and mounted for rotational movement, said disc having a port opening therethrough disposed in axial alignment with the flow passageway provided in the body when the disc is in open position, the seat rings having concave seats normally not in substantial contact with the said disc when the latter is in open position, but forming arcuately extending bearing surfaces therefor when the disc is in its closed position, and resilient fingers provided on said seat rings for engagement with said valve body to prevent displacement of the seat rings.

2. In a valve, a body having a flow passageway therethrough, seat rings mounted in said body, a spheroidal disc interposed between said seat rings and mounted for rotational movement, said disc having a port opening therethrough disposed in axial alignment with the flow passageway in the body, said disc having flat parallel faces disposed in vertical alignment with the inner ends of the seat rings, concave seats formed in the seat rings and normally having a common radius with each other and with portions of the disc when the latter member is in its closed position, and resilient fingers molded to the seat rings for engagement with said body.

3. In a valve, a body having a flow passageway therethrough, seat rings mounted in said body, an annular recess formed in the body adjacent each seat ring, a spheroidal disc interposed between said seat rings and mounted for rotational movement, said disc having a port opening therethrough disposed in axial alignment with the flow passageway in the body, said disc having flat parallel faces disposed in vertical alignment with the inner end portions of the seat rings, concave seats formed in the seat rings and normally having a common radius with each other and with the disc at predetermined positions of the latter member, and resilient fingers engaged in said annular recesses for preventing axial movement of the seat rings.

4. In a valve, a body having a flow passageway therethrough, seat rings mounted in said body, a spheroidal disc interposed between said seat rings and mounted for rotational movement, said disc having a port opening therethrough disposed in axial alignment with the flow passageway in the body, said disc having flat parallel faces disposed in vertical alignment with the inner ends of the seat rings, the seat rings having concave seats normally having a common radius with each other and with the disc in the closing position of the latter member, a retaining ring formed integral with each seat ring for confining same against internal distortion or breakage or radial displacement with respect to the body or each other and to insure an accurate mounting of the seat ring in the valve body relative to the port through the disc and the flow passage through the said body, and resilient fingers formed on said retaining rings for engagement with said body to prevent axial movement of said seat rings.

5. In a valve, a body having a flow passageway therethrough, rubber seat rings mounted in said body, said body having an annular recess adjacent each seat ring, a spheroidal disc interposed between said seat rings and mounted for rotational movement, said disc having a port opening therethrough disposed in axial alignment with the flow passageway in the body, said disc having flat parallel faces disposed in vertical alignment with the inner ends of the seat rings, concave seats formed in the seat rings and normally having a common radius with each other and with the disc in predetermined positions of the latter member, an insert formed integral with each seat ring for inhibiting internal distortion or breakage or radial displacement with respect to the body or with each member and to insure an accurate mounting of the seat ring relative to the valve body, and resilient fingers formed on said inserts for locking engagement in said annular recesses.

MURRAY A. GLEESON.

CERTIFICATE OF CORRECTION.

Patent No. 2,373,628. April 10, 1945.

MURRAY A. GLEESON.

It is hereby certified that error appears in the printed specification of the above numbered patent requiring correction as follows: Page 2, second column, line 71, claim 5, for the word "member" read --other--; and that the said Letters Patent should be read with this correction therein that the same may conform to the record of the case in the Patent Office.

Signed and sealed this 19th day of June, A. D. 1945.

Leslie Frazer (Seal)                      Acting Commissioner of Patents.